(12) United States Patent
Li et al.

(10) Patent No.: US 11,337,189 B2
(45) Date of Patent: May 17, 2022

(54) TERMINAL, NETWORK DEVICE, AND COMMUNICATION METHOD TO IMPROVE TRANSMISSION RELIABILITY

(71) Applicant: Huawei Technologies Co., Ltd., Shenzhen (CN)

(72) Inventors: Hua Li, Shanghai (CN); Zhongfeng Li, Munich (DE); Yi Qin, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 16/530,673

(22) Filed: Aug. 2, 2019

(65) Prior Publication Data
US 2019/0357205 A1 Nov. 21, 2019

Related U.S. Application Data

(63) Continuation of application No. PCT/CN2018/075132, filed on Feb. 2, 2018.

(30) Foreign Application Priority Data

Feb. 4, 2017 (CN) .......................... 201710064511.3

(51) Int. Cl.
*H04W 72/04* (2009.01)
*H04L 27/26* (2006.01)
(Continued)

(52) U.S. Cl.
CPC ..... *H04W 72/0413* (2013.01); *H04L 27/2601* (2013.01); *H04W 72/10* (2013.01); *H04W 72/12* (2013.01)

(58) Field of Classification Search
CPC ............. H04W 72/0413; H04W 72/10; H04W 72/12; H04W 72/0406; H04L 27/2601; H04L 27/26
See application file for complete search history.

(56) References Cited

U.S. PATENT DOCUMENTS

| | | | |
|---|---|---|---|
| 2010/0195629 A1 | 8/2010 | Chen et al. | |
| 2012/0163437 A1* | 6/2012 | Frederiksen | H04L 5/0053 375/224 |
| 2013/0279437 A1* | 10/2013 | Ng | H04W 48/12 370/329 |
| 2014/0314000 A1 | 10/2014 | Liu et al. | |

(Continued)

FOREIGN PATENT DOCUMENTS

| | | |
|---|---|---|
| CN | 102651911 A | 8/2012 |
| CN | 105103466 A | 11/2015 |

(Continued)

OTHER PUBLICATIONS

"Discussion on UCI and Data Multiplexing," 3GPP TSG RAN WG1 Meeting #87, Reno, USA, R1-1612530, pp. 1-3, 3rd Generation Partnership Project, Valbonne, France (Nov. 14-18, 2016).

(Continued)

*Primary Examiner* — Jenee Holland
(74) *Attorney, Agent, or Firm* — Leydig, Voit & Mayer, Ltd.

(57) ABSTRACT

This application provides a terminal, a network device, and a communication method performed by the terminal and the network device. The communication method includes: The terminal sends first uplink control information by using a plurality of spatial resources in a first spatial resource set, and the network device receives the first uplink control information by using the plurality of spatial resources in the first spatial resource set. According to the terminal, the network device, and the communication method performed by the terminal and the network device provided in this application, when the terminal can transmit uplink control information by using beams, transmission reliability of the uplink control information can be improved, thereby improving communication reliability.

17 Claims, 7 Drawing Sheets

(51) Int. Cl.
*H04W 72/10* (2009.01)
*H04W 72/12* (2009.01)
*H04L 5/00* (2006.01)
*H04B 7/0408* (2017.01)
*H04B 7/06* (2006.01)

(56) References Cited

U.S. PATENT DOCUMENTS

| | | | |
|---|---|---|---|
| 2015/0049699 A1* | 2/2015 | Takeda | H04W 76/15 370/329 |
| 2015/0156768 A1 | 6/2015 | Guan et al. | |
| 2015/0334762 A1* | 11/2015 | Yang | H04W 76/15 370/329 |
| 2016/0056941 A1 | 2/2016 | Kang et al. | |
| 2016/0295522 A1* | 10/2016 | Qin | H04W 52/28 |
| 2016/0344534 A1* | 11/2016 | Uchino | H04L 5/0053 |
| 2018/0006863 A1* | 1/2018 | Li | H04L 29/06 |
| 2018/0115965 A1* | 4/2018 | Takeda | H04W 72/1289 |

FOREIGN PATENT DOCUMENTS

| | | |
|---|---|---|
| CN | 105122871 A | 12/2015 |
| CN | 107567099 A | 1/2018 |
| WO | 2014026381 A1 | 2/2014 |

OTHER PUBLICATIONS

"On UCI transmission over PUCCH and PUSCH," 3GPP TSG RAN WG1 NR Ad Hoc Meeting, Spokane, USA, R1-1700399, XP051207936, pp. 1-4, 3rd Generation Partnership Project, Valbonne, France (Jan. 16-20, 2017).

"Beam Management—DCI monitoring," 3GPP TSG RAN WG1 NR Ad Hoc Meeting, Spokane, USA, R1-1701089, XP051208603, pp. 1-4, 3rd Generation Partnership Project, Valbonne, France (Jan. 16-20, 2017).

Huawei, HiSilicon, "QCL indication of downlink control channel and beam management reference signals," 3GPP TSG RAN WG1 NR Ad Hoc Meeting, Spokane, USA, R1-1700405, XP055528259, total 4 pages, 3rd Generation Partnership Project, Valbonne, France (Jan. 16-20, 2017).

Intel Corporation, "On QCL to support UE beam management," 3GPP TSG RAN WG1 Meeting #86bis, Lisbon, Portugal, R1-1609525, XP051159595, total 4 pages, 3rd Generation Partnership Project, Valbonne, France (Oct. 10-14, 2016).

Nokia, Alcatel-Lucent Shanghai Bell, "On QCL Framework and Configurations in NR," 3GPP TSG RAN WG1 NR Ad-Hoc Meeting, Spokane, USA, R1-1701107, XP051202402, total 6 pages, 3rd Generation Partnership Project, Valbonne, France (Jan. 16-20, 2017).

* cited by examiner

TERMINAL, NETWORK DEVICE, AND COMMUNICATION METHOD TO IMPROVE TRANSMISSION RELIABILITY

CROSS-REFERENCE TO RELATED APPLICATIONS

This application is a continuation of International Application No. PCT/CN2018/075132, filed on Feb. 2, 2018, which claims priority to Chinese Patent Application No. 201710064511.3, filed on Feb. 4, 2017. The disclosures of the aforementioned applications are hereby incorporated by reference in their entireties.

TECHNICAL FIELD

Embodiments of this application relate to the communications field, and more specifically, to a terminal, a network device, and a communication method.

BACKGROUND

With development of communications technologies, in a new radio (NR) communications technology, high-band spectrum resources are applied to effectively implement big data rate communication.

To eliminate high-band path attenuation and enlarge coverage, a network device and a terminal usually communicate by using beams. To be specific, the network device or the terminal performs analog weighting on a plurality of antenna array elements of the network device or the terminal, so that energy of signals generated after weighting is enhanced in a specific direction, and in the specific direction, the signals are sent to a peer end or the signals sent by a peer end are received.

During actual application, the terminal may send an uplink data channel to the network device by using beams. Further, the terminal may transmit uplink control information on the uplink data channel.

Because a wavelength for high-band communication is relatively short, a diffraction capability of a signal is relatively poor, and is prone to be affected by an obstacle. When the uplink control information is transmitted on the beams, link quality degrades due to blocking. As a result, transmission reliability of the control information is reduced.

How the terminal reliably transmits the uplink control information on the uplink data channel by using the beams is to be resolved currently.

SUMMARY

This application provides a terminal, a network device, and a communication method performed by the terminal and the network device, so that transmission reliability of uplink control information can be improved when the terminal transmits the uplink control information on an uplink data channel by using beams, thereby improving communication reliability.

According to a first aspect, a communication method is provided, where the communication method includes: sending, by a terminal, first uplink control information by using a plurality of spatial resources in a first spatial resource set.

The terminal transmits uplink control information by using the plurality of spatial resources. This can improve transmission reliability of the uplink control information, thereby improving communication reliability.

Optionally, the plurality of spatial resources in the first spatial resource set may correspond to different QCL information.

With reference to the first aspect, in a first possible implementation, the sending, by a terminal, first uplink control information by using a plurality of spatial resources in a first spatial resource set includes: sending, by the terminal, the first uplink control information in a plurality of time-divided time units by using the plurality of spatial resources in the first spatial resource set.

With reference to the first aspect or the first possible implementation, in a second possible implementation, the communication method further includes: receiving, by the terminal, first indication information, where the first indication information is used to indicate the plurality of spatial resources in the first spatial resource set.

In this embodiment of this application, the terminal receives the first indication information, and can send the uplink control information by using the plurality of spatial resources indicated in the first indication information. This can improve communication flexibility.

With reference to any one of the first aspect, or the first and the second possible implementations, in a third possible implementation, the first uplink control information includes at least one of the following information: a hybrid automatic repeat request message, rank indicator information, channel quality indicator information, a precoding matrix index, recovery request information, resource identifier information, and reference signal received power.

With reference to any one of the first aspect, or the first to the third possible implementations, in a fourth possible implementation, the sending, by a terminal, first uplink control information by using a plurality of spatial resources in a first spatial resource set includes: mapping, by the terminal, the first uplink control information onto a time-domain resource based on a resource mapping priority of the first uplink control information.

With reference to the first aspect, or the first or the fourth possible implementation, in a fifth possible implementation, the communication method further includes: receiving, by the terminal, downlink scheduling information, where the downlink scheduling information includes modulation and coding schemes of a plurality of time units in a first time unit set; and a spatial resource in the first spatial resource set is a spatial resource used to transmit a first transport block, and a modulation and coding scheme of the first transport block is a modulation and coding scheme in the modulation and coding schemes of the plurality of time units that meets a first condition.

With reference to the fifth possible implementation, in a sixth possible implementation, the first condition includes: The modulation and coding scheme has a highest value.

With reference to any one of the first aspect, or the first to the sixth possible implementations, in a seventh possible implementation, the first indication information includes an index of the first uplink control information and an index of a spatial resource in the first spatial resource set.

With reference to any one of the first aspect, or the first to the seventh possible implementations, in an eighth possible implementation, the first spatial resource set is a subset of a second spatial resource set, the second spatial resource set includes a plurality of spatial resources used to send second uplink control information by the terminal, and the second uplink control information and the first uplink control information are different types of information.

With reference to the eighth possible implementation, in a ninth possible implementation, the communication method further includes: sending, by the terminal, the second uplink control information by using the second spatial resource set.

With reference to the ninth possible implementation, in a tenth possible implementation, the sending, by the terminal, the second uplink control information by using the second spatial resource set includes: sending, by the terminal, the second uplink control information in the plurality of time-divided time units by using the plurality of spatial resources in the second spatial resource set.

With reference to any one of the eighth to the tenth possible implementations, in an eleventh possible implementation, the communication method further includes: receiving, by the terminal, second indication information, where the second indication information is used to indicate the second spatial resource set.

With reference to any one of the eighth to the eleventh possible implementations, in a twelfth possible implementation, the second indication information includes an index of the second uplink control information and an index of a spatial resource in the second spatial resource set.

With reference to any one of the eighth to the twelfth possible implementations, in a thirteenth possible implementation, the second uplink control information includes at least one of the following information: a HARQ-ACK, an RR, an RI, a BI, and RSRP, and the first uplink control information includes at least one of the BI, the RSRP, a CQI, and a PMI that is different from the second uplink control information.

According to a second aspect, a communication method is provided, where the communication method includes: receiving, by a network device, the first uplink control information sent by a terminal by using a plurality of spatial resources in a first spatial resource set.

The network device receives uplink control information transmitted by the terminal by using the plurality of spatial resources. This can improve transmission reliability of the uplink control information, thereby improving communication reliability.

Optionally, the plurality of spatial resources in the first spatial resource set may correspond to different QCL information.

With reference to the second aspect, in a first possible implementation, the receiving, by a network device, the first uplink control information sent by a terminal by using a plurality of spatial resources in a first spatial resource set includes: receiving, by the network device, the first uplink control information sent by the terminal in a plurality of time-divided time units by using the plurality of spatial resources in the first spatial resource set.

With reference to the second aspect or the first possible implementation, in a second possible implementation, the communication method further includes: sending, by the network device, first indication information, where the first indication information is used to indicate the plurality of spatial resources in the first spatial resource set.

In this embodiment of this application, the network device sends the first indication information, and can flexibly instruct the terminal to send the uplink control information by using the plurality of spatial resources indicated in the first indication information. This can improve communication flexibility.

With reference to any one of the second aspect, or the first and the second possible implementations, in a third possible implementation, the first uplink control information includes at least one of the following information: a hybrid automatic repeat request message, rank indicator information, channel quality indicator information, a precoding matrix index, recovery request information, resource identifier information, and reference signal received power.

With reference to any one of the second aspect, or the first to the third possible implementations, in a fourth possible implementation, the receiving, by a network device, the first uplink control information sent by a terminal on an uplink data channel by using a plurality of spatial resources in a first spatial resource set includes: obtaining, by the network device, the first uplink control information in a time-domain resource based on a resource mapping priority of the first uplink control information.

With reference to the second aspect, or the first or the fourth possible implementation, in a fifth possible implementation, the communication method further includes: sending, by the network device, downlink scheduling information, where the downlink scheduling information includes modulation and coding schemes of a plurality of time units in a first time unit set; and a spatial resource in the first spatial resource set is a spatial resource used to transmit a first transport block, and a modulation and coding scheme of the first transport block is a modulation and coding scheme in the modulation and coding schemes of the plurality of time units that meets a first condition.

With reference to the fifth possible implementation, in a sixth possible implementation, the first condition includes: The modulation and coding scheme has a highest value.

With reference to any one of the second aspect, or the first to the sixth possible implementations, in a seventh possible implementation, the first indication information includes an index of the first uplink control information and an index of a spatial resource in the first spatial resource set.

With reference to any one of the second aspect, or the first to the seventh possible implementations, in an eighth possible implementation, the first spatial resource set is a subset of a second spatial resource set, the second spatial resource set includes a plurality of spatial resources used to send second uplink control information by the terminal, and the second uplink control information and the first uplink control information are different types of information.

With reference to the eighth possible implementation, in a ninth possible implementation, the communication method further includes: receiving, by the network device, the second uplink control information sent by the terminal by using the second spatial resource set.

With reference to the ninth possible implementation, in a tenth possible implementation, the receiving, by the network device, the second uplink control information sent by the terminal on an uplink data channel by using the second spatial resource set includes: receiving, by the network device, the second uplink control information sent by the terminal in the plurality of time-divided time units by using the plurality of spatial resources in the second spatial resource set.

With reference to any one of the eighth to the tenth possible implementations, in an eleventh possible implementation, the communication method further includes: sending, by the network device, second indication information, where the second indication information is used to indicate the second spatial resource set.

With reference to any one of the eighth to the eleventh possible implementations, in a twelfth possible implementation, the second indication information includes an index of the second uplink control information and an index of a spatial resource in the second spatial resource set.

With reference to any one of the eighth to the twelfth possible implementations, in a thirteenth possible implementation, the second uplink control information includes at least one of the following information: a HARQ-ACK, an RR, an RI, a BI, and RSRP, and the first uplink control information includes at least one of the BI, the RSRP, a CQI, and a PMI that is different from the second uplink control information.

According to a third aspect, a terminal is provided, where the terminal includes modules configured to perform the communication method in any one of the first aspect or the possible implementations of the first aspect.

According to a fourth aspect, a network device is provided, where the network device includes modules configured to perform the communication method in any one of the second aspect or the possible implementations of the second aspect.

According to a fifth aspect, an embodiment of this application provides a terminal, including a receiver. Optionally, the terminal may further include a processor and a transmitter. The receiver, the transmitter, and the processor are configured to implement the communication method in any one of the first aspect or the possible implementations of the first aspect.

According to a sixth aspect, an embodiment of this application provides a network device, including a transmitter. Optionally, the network device may further include a processor and a receiver. The transmitter, the receiver, and the processor are configured to implement the communication method in any one of the second aspect or the possible implementations of the second aspect.

According to a seventh aspect, an embodiment of this application provides a computer readable medium. The computer readable medium stores program code to be executed by a terminal, and the program code includes an instruction used to perform the communication method in any one of the first aspect or the possible implementations of the first aspect.

According to an eighth aspect, an embodiment of this application provides a computer readable medium. The computer readable medium stores program code to be executed by a network device, and the program code includes an instruction used to perform the communication method in any one of the second aspect or the possible implementations of the second aspect.

According to a ninth aspect, an embodiment of this application provides a computer program product including an instruction. When the instruction runs on a terminal, the terminal performs the communication method in any one of the first aspect or the possible implementations of the first aspect.

According to a tenth aspect, an embodiment of this application provides a computer program product including an instruction. When the instruction runs on a network device, the network device performs the communication method in any one of the second aspect or the possible implementations of the second aspect.

According to an eleventh aspect, an apparatus is provided. The apparatus provided in this application has functions of implementing behaviors of the terminal or the network device in the foregoing method aspects, and includes components (means) configured to perform steps or functions described in the foregoing method aspects. The steps or the functions may be implemented by software, hardware (or a circuit), or a combination of hardware and software.

In a possible design, the apparatus includes one or more processors and a communications unit. The one or more processors are configured to support the apparatus in performing corresponding functions of the terminal in the foregoing method. The communications unit is configured to support the apparatus in communicating with another device, to implement a receiving and/or sending function.

Optionally, the apparatus may further include one or more memories. The memory is configured to be coupled with the processor, and store a program instruction and/or data that are/is necessary for the apparatus. The one or more memories may be integrated with the processor together, or may be separated from the processor. This is not limited in this application.

The apparatus may be an intelligent terminal, a wearable device, or the like. The communications unit may be a transceiver or a transceiver circuit. Optionally, the transceiver may be an input/output circuit or interface.

Alternatively, the apparatus may be a communications chip. The communications unit may be an input/output circuit or interface of the communications chip.

In another possible design, the apparatus includes a transceiver, a processor, and a memory. The processor is configured to control the transceiver or an input/output circuit to receive/send a signal, the memory is configured to store a computer program, and the processor is configured to run the computer program in the memory, so that the apparatus performs the method completed by the terminal in any one of the first aspect or the possible implementations of the first aspect.

In a possible design, the apparatus includes one or more processors and a communications unit. The one or more processors are configured to support the apparatus in performing corresponding functions of the network device in the foregoing method. The communications unit is configured to support the apparatus in communicating with another device, to implement a receiving and/or sending function.

Optionally, the apparatus may further include one or more memories. The memory is configured to be coupled with the processor, and store a program instruction and/or data that are/is necessary for the network device. The one or more memories may be integrated with the processor together, or may be separated from the processor. This is not limited in this application.

The apparatus may be a base station, a gNB, a TRP, or the like. The communications unit may be a transceiver or a transceiver circuit. Optionally, the transceiver may be an input/output circuit or interface.

Alternatively, the apparatus may be a communications chip. The communications unit may be an input/output circuit or interface of the communications chip.

In another possible design, the apparatus includes a transceiver, a processor, and a memory. The processor is configured to control the transceiver or an input/output circuit to receive/send a signal, the memory is configured to store a computer program, and the processor is configured to run the computer program in the memory, so that the apparatus performs the method completed by the network device in any one of the second aspect or the possible implementations of the second aspect.

According to a twelfth aspect, a system is provided, where the system includes the terminal and the network device.

DESCRIPTION OF EMBODIMENTS

The following describes the technical solutions in this application with reference to the accompanying drawings.

Figure 1:
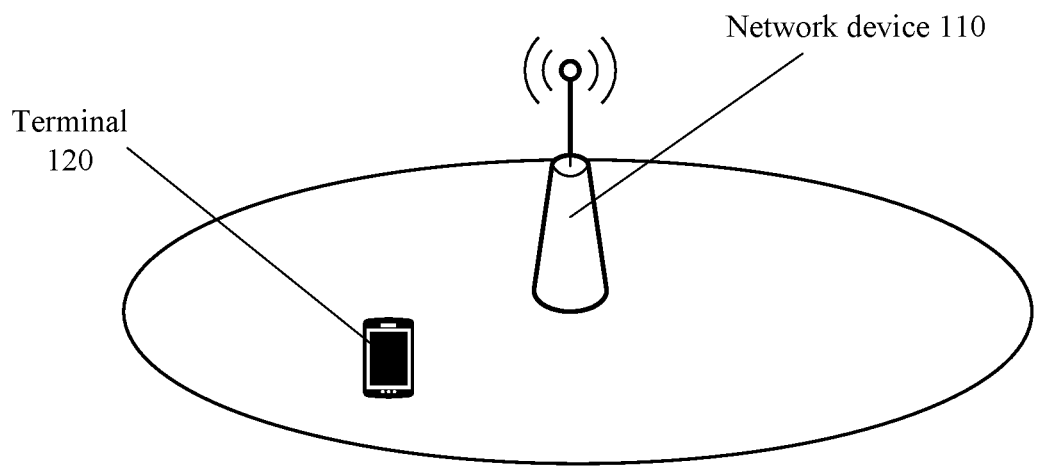
FIG. 1 is an illustrative structural diagram of a communications system to which a communication method according to an embodiment of this application can be applied.

FIG. 1 shows an illustrative structural diagram of a communications system to which a communication method according to the embodiments of this application can be applied. It should be understood that the embodiments of this application are not limited to a system architecture shown in FIG. 1. In addition, apparatuses in FIG. 1 may be hardware, software obtained through function-based division, or a combination thereof.

It can be learned from FIG. 1 that the communications system to which the communication method according to the embodiments of this application can be applied may include a network device 110 and a terminal 120.

The network device 110 may be a base station. It should be understood that a specific type of the base station is not limited in the embodiments of this application. In systems using different radio access technologies, devices with a base station function may have different names. For ease of description, in all of the embodiments of this application, the apparatuses that provide wireless communication functions for the terminal are collectively referred to as base stations, for example, base station devices and small cell devices (pico) that are in a future network.

The network device may be a device with a wireless transceiver function or a chip that can be disposed in a device. The device includes but is not limited to an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), an access point (AP) in a wireless fidelity (WIFI) system, a wireless relay node, a wireless backhaul node, and a transmission point (TP, or a transmission and reception point (TRP)); or may be a gNB or a transmission point (TRP or TP) that are in a 5G system such as an NR system, or one antenna panel or a group of antenna panels (including a plurality of antenna panels) of a base station in a 5G system; or may be a network node that constitutes a gNB or a transmission point, such as a baseband unit (BBU) or a distributed unit (DU).

In some deployments, a gNB may include a central unit (CU) and a DU. The gNB may further include a radio frequency unit (radio unit, RU). The CU implements some functions of the gNB, and the DU implements some functions of the gNB. For example, the CU implements functions at a radio resource control (RRC) layer and a packet data convergence protocol (PDCP) layer, and the DU implements functions at a radio link control (RLC) layer, a media access control (MAC) layer, and a physical (PHY) layer. RRC layer information is eventually converted into PHY layer information or is converted from PHY layer information. In such an architecture, it may be considered that higher layer signaling such as RRC layer signaling or PHCP layer signaling is sent by the DU or by the DU and the RU together. It can be understood that the network device may be a CU node, a DU node, or a device including a CU node and a DU node. In addition, the CU may be classified as a network device in an access network RAN, or the CU may be classified as a network device in a core network CN. This is not limited herein.

The terminal 120 may be user equipment (UE). The UE may communicate with one or more core networks through a radio access network (RAN). The UE may be an access terminal, a terminal device, a subscriber unit, a subscriber station, a mobile station, a mobile console, a remote station, a remote terminal, a mobile device, a user terminal, a wireless communications device, a user agent, or a user apparatus. The UE may be a cellular phone, a cordless telephone set, a session initiation protocol (SIP) phone, a wireless local loop (WLL) station, a personal digital assistant (PDA), a handheld device with a wireless communication function, a computing device, another device connected to a wireless modem, a vehicle-mounted device, a wearable device, a terminal device in the Internet of Things or Internet of Vehicles, a terminal device in any form in a future network, or the like.

The embodiments of this application not only can be applied to a conventional typical network, but also can be applied to a future UE-centric network. A non-cell network architecture is introduced into the UE-centric network. To be specific, a large quantity of small cells are deployed in a specific area, to form a hyper cell, where each small cell is a transmission point (TP) or a TRP in the hyper cell, and is connected to a central controller. When the UE moves within the hyper cell, a network-side device selects a new sub-cluster for the UE in real time to serve the UE, thereby avoiding a real cell handover and implementing service continuity of the UE. The network-side device includes a wireless network device. Alternatively, in the UE-centric network, a plurality of network-side devices such as small cells may have independent controllers such as distributed controllers, the small cells can independently schedule users, and the small cells interact information in a long term, so that the small cells can flexibly provide collaboration services for the UE.

Different base stations in the embodiments of this application may be base stations with different identities or base stations with a same identity that are deployed at different geographical positions. Before a base station is deployed, the base station does not know whether the base station is to be applied to a scenario in the embodiments of this application. Therefore, the base station or a baseband chip should support the method provided in the embodiments of this application before being deployed. It can be understood that the base stations with the different identities may be base station identities, or may be cell identities or other identities.

Some scenarios in the embodiments of this application are described by using a scenario of an NR network in wireless communications networks as an example. It should be pointed out that the solutions in the embodiments of this application may be further applied to other wireless communications networks, and corresponding names may be alternatively replaced with names of corresponding functions in the other wireless communications networks. In the communications system shown in FIG. 1, the network device 110 and the terminal 120 may transmit data to each other on high-band resources by using beams.

A high-band wavelength is relatively short, so that an antenna distance can be reduced, and therefore, more antenna array elements can be disposed within a same area. A large quantity of antenna array elements may form a large-scale array antenna, and the large-scale array antenna may bring about an array gain through beamforming, thereby effectively enlarging coverage and eliminating high-band path attenuation.

For the large-scale antenna array, it is impossible to implement, from a perspective of costs, that each of the antenna array elements is connected to a radio frequency channel. When a quantity of radio frequency channels is limited, a phase shifter is used at a radio frequency end, to implement analog phase weighting at the radio frequency end, so that an analog beam is formed at the radio frequency end.

The analog beam may be formed in the network device or the terminal. The network device or the terminal may change phase weights of the antenna array elements, to enhance energy of signals in a specific direction, so that the network device or the terminal can better receive or send the signals in the specific direction. The signal whose energy is enhanced in the specific direction or an antenna port through which the energy-enhanced signal is sent in the specific direction may be referred to as a beam. In other words, the network device or the terminal may send or receive beams in different directions.

The analog beam or an analog and digital hybrid weighting manner may be used for a high band, to meet a coverage requirement.

If the analog beam or a hybrid beam is used for communication, for a same antenna panel, a plurality of beams are used to send information in a time division sending manner. In other words, if the analog beam or the hybrid beam is used for communication, for a same antenna panel, only one analog beam can be formed at a same time, pointing to one direction, that is, covering a specific area.

For example, a large quantity of antenna array elements may be disposed on the network device 110 and the terminal 120. When the terminal 120 sends information (for example, uplink data information or uplink control information) to the network device 110, a phase shifter may be disposed at a radio frequency end of the terminal 120, to change phase weights of the antenna array elements by using the phase shifter, implement analog phase weighting on the plurality of antenna array elements, enhance energy of signals in a direction of the network device, form an analog beam pointing to the network device 120, and send information to the network device 110 by using the analog beam.

Correspondingly, a phase shifter may be alternatively disposed at a radio frequency end of the network device, to change phase weights of the antenna array elements by using the phase shifter, implement analog phase weighting on the plurality of antenna array elements, and form a receive beam to receive information sent by the terminal 120.

Similarly, in an inverse process of uplink transmission, when the network device sends information (namely, downlink data information or downlink control information) to the terminal 120, the foregoing communication mode may also be used. Details are not further described herein.

In the embodiments of this application, the beam may be referred to as a spatial resource. Different beams may be considered as different spatial resources. Different from LTE beams, the beams in the embodiments of this application are mainly analog beams. Only one analog beam can be formed on one antenna panel at a same time. If the terminal or the network device has only one antenna panel, only a time division manner can be used by a plurality of beams when the plurality of beams are required for sending.

The technical solutions in this application not only can be applicable to a scenario in which different beams are used for transmission, but also can be applicable to a scenario in which different port resources are used for transmission. A port is a logical resource identifier, and can be used to distinguish between different spatial resources, that is, can be used to distinguish between different beams.

In this application, different spatial resources may have different quasi co-location (quasi-co-located, QCL) information. The QCL information is usually used to indicate a relationship between reference signal ports. In a communication mode in which beams are used, before data is transmitted by using an uplink beam, pairing scanning needs to be performed on beams. The terminal needs to send an uplink reference signal to scan the beams, so as to determine a transmit beam used by the terminal to send the data and a receive beam used by the network device. The reference signal may be a sounding reference signal (SRS) signal or another reference signal. When the terminal has a beam-based correspondence or reciprocity, the reference signal may be alternatively a specific downlink reference signal. The reciprocity means that an uplink beam of the terminal may be determined based on a downlink beam scanning result. An optimal receive beam determined by the terminal through downlink beam scanning corresponds to an optimal uplink transmit beam.

The QCL information in this application may be a parameter that describes a spatial relationship, for example, an angle of departure (AOD) or a spatial correlation between transmit beam antennas. When a specific beam is actually used for data transmission, if the terminal obtains the QCL information, the terminal may determine a corresponding transmit beam by using the QCL information, for example, by determining that a port for a demodulation reference signal (DMRS) on a physical uplink shared channel (PUSCH) or a physical uplink control channel (PUCCH) and a port for the SRS used for previous scanning are QCLed. In other words, a beam direction of the PUSCH or the PUCCH is the same as a previous beam direction of the SRS. In this application, when the plurality of beams are required for sending, beams in different directions are required, and therefore, the different beams have different QCL information.

A quasi co-location (quasi co-located, QCL) relationship between two antenna ports means that a channel large scale parameter of one antenna port may be inferred from a channel large scale parameter conveyed by another antenna port. The large scale parameter may include one or more of an average gain, an average delay, delay spread, a Doppler shift, Doppler spread, and a spatial parameter (or spatial Rx parameters).

The spatial parameter may include one or more of an angle of arrival (AOA), a dominant angle of arrival (dominant AoA), an average angle of arrival (average AoA), an angle of departure (AOD), a channel related matrix, a power angle spread spectrum of the angle of arrival, an average angle of departure (average AoD), a power angle spread spectrum of the angle of departure, a transmit channel correlation, a receive channel correlation, transmit beamforming, receive beamforming, a spatial channel correlation, a spatial filter or a spatial filtering parameter, the spatial RX parameter or weight information, and the like.

It should be noted that FIG. 1 is only an illustrative diagram, and quantities of the network devices 110 and the terminals 120 do not constitute any limitation on the solutions provided in this application. During actual application, a network may be deployed with network devices and terminals whose quantities are different from the quantities shown in FIG. 1.

In addition, the solutions provided in this application may be further applicable to any communications system using beams for communication, other than that shown in FIG. 1. This is not limited in the embodiments of this application.

Figure 12:
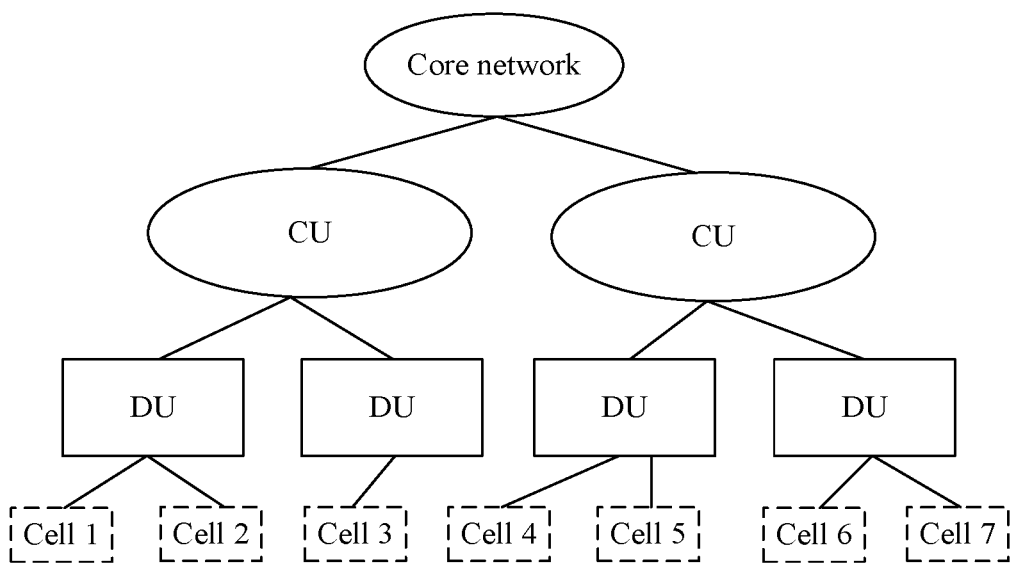
FIG. 12 is a schematic diagram of an application scenario according to an embodiment of this application.

FIG. 12 shows a possible application environment according to an embodiment of this application. A base station shown in FIG. 12 may be a base station in 5G. Specifically, for a base station in a 5G system, a central unit (CU) may be separated from a distributed unit (DU), or protocol stacks are separated. In other words, the CU and the DU may process different protocol layers. There may be a communication connection between the CU and the DU, to mutually transfer information about related protocol layers. For example, in a possible scheme, the DU may process a radio link control (RLC) protocol and lower layer protocols, and the CU may process protocols above the RLC layer. For example, the CU may process a packet data convergence protocol (PDCP) or a radio resource control (RRC) protocol. The DU may be used to process a physical layer (PHY) protocol, a media access control (MAC) protocol, and the RLC protocol. One CU may be connected to one or more DUs, and one DU may include one or more cells. Optionally, the CU and the DU may be collectively referred to a gNB.

The communication method, the network device, and the terminal provided in this application are described in the following embodiments of this application by using the communications system shown in FIG. 1 as an example.

Figure 2:
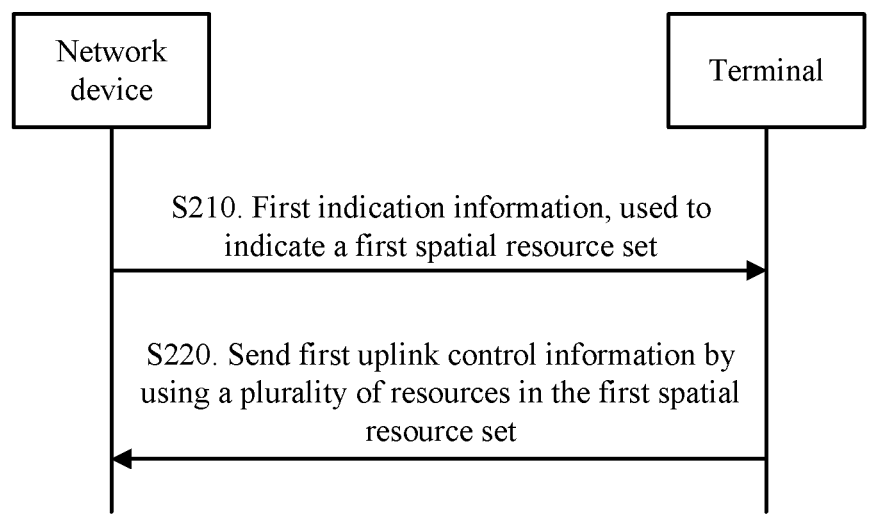
FIG. 2 is an illustrative flowchart of a communication method according to an embodiment of this application.

FIG. 2 is a schematic flowchart of a communication method according to an embodiment of this application. It should be understood that, FIG. 2 shows steps or operations of the communication method, but these steps or operations are only examples. In this embodiment of this application, other operations or variations of the operations in FIG. 2 may also be performed. In addition, the steps in FIG. 2 may be performed in a sequence different from that presented in FIG. 2, and possibly not all of the operations in FIG. 2 need to be performed.

S220. A terminal sends first uplink control information by using a plurality of spatial resources in a first spatial resource set. Correspondingly, a network device receives the first uplink control information.

The first spatial resource set may be preconfigured in the terminal. Specifically, the first spatial resource set may be configured in both the terminal and the network device, and the first spatial resource set may include indexes or identifier information of the plurality of spatial resources.

In the communication method, the terminal uses the plurality of spatial resources to send the first uplink control information. When uplink control information transmitted on some of the plurality of spatial resources is affected, the rest of the plurality of spatial resources may still be used to transmit the uplink control information. This can improve transmission reliability of the uplink control information, and eventually can improve reliability of communication between the terminal and the network device.

The spatial resource in this embodiment of this application may be a beam. In this case, the first spatial resource set may be referred to as a first beam set; and that the first spatial resource set includes the plurality of spatial resources may mean that: The first spatial resource set includes a plurality of beams. Each beam has a corresponding analog phase weight.

The following content in this embodiment of this application further describes the communication method according to this embodiment of this application by using an example in which the spatial resource is the beam. It should be noted that the beam in the following content may be replaced with a port or another name having a same meaning as that of the beam.

The network device may determine a plurality of beams that have higher quality (for example, an RSRP value) of communication between the network device and the terminal or a low spatial correlation as the first beam set. Specifically, the network device may determine a plurality of beams, having higher communication quality or a lower correlation, in beams that may be used by the terminal, as the first beam set. Alternatively, each beam may be a beam in receive and transmit beams that have been paired between the network device and the terminal.

In other words, communication quality of a beam in the first beam set may be higher than communication quality of another beam that may be used for communication between the network device and the terminal.

If the network device and the terminal may communicate by using five beams, and quality of three beams in the five beams is higher than quality of other two beams, the network device may determine the three beams as the first beam set.

The terminal sends the first uplink control information by using the beams having higher communication quality. This can further improve reliability of communication between the terminal and the network device.

The first uplink control information may include one or more types of information.

When the first uplink control information includes a plurality of types of information, it indicates that the plurality of types of information are sent by using a same beam set, namely, the first beam set.

The first uplink control information may include a beam identifier (beam index, BI). For example, after the network device delivers a to-be-measured reference signal and the terminal measures the reference signal, the terminal may report, to the network device by using the BI, which beams have higher quality, so as to help the network device schedule the beams based on a measurement result.

The first uplink control information may include a beam recovery request (recovery request, RR) message. In a high-band communications system in which beams are used for communication, when the beams are affected, for example, when the beams are interrupted due to blocking, the terminal may notify, by using the RR message, the network device that communication has been interrupted. After receiving the RR message, the network device takes some measures, for example, beam switching, to recover communication.

The first uplink control information may include reference signal received power (RSRP) of a beam.

The first uplink control information may further include at least one of the following information: a hybrid automatic repeat request (hybrid auto retransmission request-acknowledgement, HARQ-ACK), a rank indicator (RI), a channel quality indicator (CQI), and a precoding matrix index (PMI). For definitions of the RI, the HARQ-ACK, the CQI, the PMI, and the RSRP, refer to definitions of same or similar terms in LTE technologies. For brevity, details are not further described herein.

The terminal may send the first uplink control information on an uplink data channel by using the plurality of spatial resources in the first spatial resource set.

In the communication method shown in FIG. 2, optionally, the plurality of resources in the first control resource set may not be preconfigured in the terminal. In this case, the communication method shown in FIG. 2 may further include: S210. The network device sends first indication information, where the first indication information is used to indicate the first spatial resource set, and the first spatial resource set includes the plurality of spatial resources. Correspondingly, the terminal receives the first indication information. Correspondingly, the terminal receives the first indication information.

When the first uplink control information includes the plurality of types of information, the network device indicates, by using the first indication information, a beam set used by the terminal to send the plurality of types of information. This can reduce signaling, that is, save communication resources.

The first indication information may include an index of each type of information in the first uplink control information, and an index of each beam in the first beam set, an index of a beam pair to which each beam belongs, or an index of a beam group to which each beam belongs. Indicating the information and beams by using the indexes can reduce signaling overheads, thereby saving communication resources.

The first indication information may further include QCL information, and the QCL information is used to indicate that ports are similar in a specific spatial parameter. If the terminal can learn that the ports have similar specific spatial parameters, the two ports have similar spatial characteristics.

In this application, to instruct the terminal to use different transmit beams, information that a DMRS port carrying a PUCCH or a PUSCH and an SRS port carrying a PUCCH or a PUSCH are QCLed with respect to a specific parameter may be added to the first indication information. The QCL parameter may an AOA or a spatial correlation between the transmit antennas. In this way, control information can be sent on different beams. The network device may send the first indication information by using higher layer signaling. Correspondingly, the terminal may receive the first indication information by using the higher layer signaling.

The higher layer signaling may include radio resource control (RRC) signaling and media access control-control element (MAC-CE) signaling.

The network device may send the first indication information by using downlink control information. Correspondingly, the terminal may receive the first indication information by using the downlink control information.

In the communication method shown in FIG. 2, optionally, the plurality of resources in the first control resource set may not be preconfigured in the terminal. In this case, the communication method shown in FIG. 2 may further include: The network device sends downlink scheduling information, where the downlink scheduling information includes modulation and coding schemes of a plurality of time units. Correspondingly, the terminal receives the downlink scheduling information. After receiving the downlink scheduling information, the terminal may determine a modulation and coding scheme in the plurality of time units that meets a specific condition, for example, a modulation and coding scheme whose value is greater than a specific threshold, and determine that a beam corresponding to a transport block in the plurality of time units that uses the value of the modulation and coding scheme forms the first beam set.

In other words, the beams in the first beam set in S220 are beams used to transmit a first transport block, and a modulation and coding scheme of the first transport block is a modulation and coding scheme in the modulation and coding schemes of the plurality of time units that meets a first condition.

In this embodiment of this application, the terminal sends the first uplink control information by using the beam corresponding to the transport block that is in the plurality of time units and whose modulation and coding scheme value meets the first condition. This can further improve reliability of communication of the first uplink control information.

The first condition may be preconfigured in the terminal, for example, may be configured according to a communication standard or may be configured based on configuration information sent by the network device.

The first condition may be specifically: A modulation and coding scheme has a highest value. To be specific, the modulation and coding scheme of the first transport block has a highest value among the modulation and coding schemes of the plurality of time units.

A time unit may be a subframe. In other words, the downlink scheduling information may include modulation and coding schemes of a plurality of subframes. It should be understood that each subframe may have a plurality of modulation and coding schemes.

Figure 3:
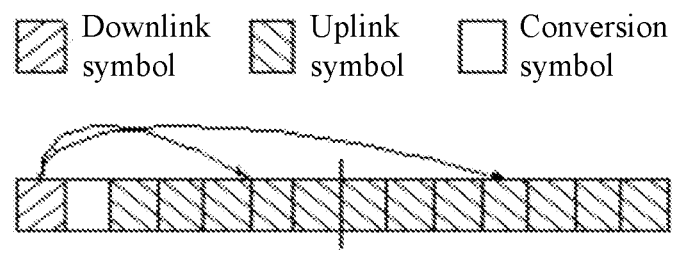
FIG. 3 is an illustrative diagram of a downlink scheduling information sending method according to an embodiment of this application.

In two subframes shown in FIG. 3, each subframe includes seven symbols, the first subframe is a bidirectional subframe, the second subframe is a full uplink subframe, and a downlink symbol in the first subframe carries scheduling information of the two subframes.

In this case, the terminal may receive, in the scheduling information of the first downlink subframe, information about modulation and coding schemes used by the two subframes. Then, the terminal may determine which one of the two subframes has a modulation and coding scheme of a higher value, and send the first uplink control information by using a beam corresponding to a transport block that uses the modulation and coding scheme of the higher value.

The following information may be preconfigured in the terminal, for example, configured according to a standard: When there are a plurality of modulation and coding schemes of highest values, that is, when there are a plurality of transport blocks having the modulation and coding schemes of the highest values, the first uplink control information may be sent by using a beam that comes first in time and that is in beams corresponding to the transport blocks having the modulation and coding schemes of the highest values.

Figure 4:
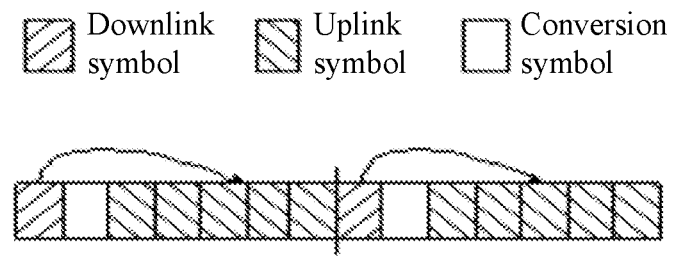
FIG. 4 is an illustrative diagram of a downlink scheduling information sending method according to another embodiment of this application.

When no time units are scheduled in a centralized manner, the first beam set used to send the first uplink control information needs to be indicated. As shown in FIG. 4, two subframes are included, each subframe includes seven symbols, and each subframe includes scheduling information of the subframe. In this way, when scheduling uplink data channels of the terminal on a plurality of subframes, the network device may send indication information to the terminal, to indicate which subframe the first uplink control information is transmitted on.

In the communication method shown in FIG. 2 or the possible implementations of the communication method, the first beam set may be a subset of a second beam set. The second beam set includes a plurality of beams that may be used by the terminal to send second uplink control information, and the second uplink control information and the first uplink control information are different types of information.

For example, the second uplink control information may include at least one of the HARQ-ACK, the RR, the RI, the BI, and the RSRP; and the first uplink control information may include at least one of the BI, the RSRP, the CQI, and the PMI that is different from the information included in the first uplink control information.

Information that the plurality of beams included in the second beam set may be used to send the second uplink control information may be configured in the terminal, or may be indicated by the network device. If the information is indicated by the network device, the communication method shown in FIG. 2 or the possible implementations of the communication method may further include: The network device sends second indication information, where the second indication information is used to indicate the second beam set used by the terminal to send the second uplink control information. Correspondingly, the terminal receives the second indication information.

Information in the second uplink control information may be more important than information in the first uplink control information. In other words, the information in the second uplink control information has greater impact on communication between the terminal and the network device than the information in the first uplink control information.

In this case, the second beam set includes more beams, and the terminal may use the more beams to send the second uplink control information of a higher degree of importance. This can improve reliability of communication of the second uplink control information. The first beam set includes fewer beams, and the terminal may use the fewer beams to send the first uplink control information of a lower degree of importance. This can save communication resources.

The network device may send the second indication information by using higher layer signaling. Correspondingly, the terminal may receive the second indication information by using the higher layer signaling.

The higher layer signaling may include RRC signaling and media access control-control element (MAC-CE) signaling.

The network device may send the second indication information by using downlink control information. Correspondingly, the terminal may receive the second indication information by using the downlink control information.

The second uplink control information may include one or more types of information.

When the second uplink control information includes a plurality of types of information, it indicates that the plurality of types of information are sent by using a same beam set, namely, the second beam set. In other words, the network device may indicate, by using the second indication information, the beam set used by the terminal to send the plurality of types of information, thereby reducing signaling, that is, saving communication resources.

The second indication information may include an index of each type of information in the second uplink control information, and an index of each beam in the second beam set, an index of a beam pair to which each beam belongs, or an index of a beam group to which each beam belongs. Indicating the information and beams by using the indexes can reduce signaling overheads, thereby saving communication resources.

In the communication method shown in FIG. 2 or the possible implementations of the communication method, when the terminal sends the first uplink control information on the uplink data channel by using the plurality of beams in the first beam set, the terminal may map the first uplink control information onto a time-domain resource based on a resource mapping priority of information included in the first uplink control information.

Before this, the terminal may obtain a resource mapping priority and/or a resource mapping manner. Then, the terminal maps the first uplink control information onto the time-domain resource based on the resource mapping priority and the resource mapping manner.

The resource mapping manner and/or the resource mapping priority may be configured according to a communication standard or may be received from the network device.

The time-domain resource may be specifically a time-domain symbol. In this case, the resource mapping manner may include: A higher resource mapping priority of information indicates a shorter symbol distance between a target time-domain symbol of the information and a time-domain symbol of a reference signal; otherwise, a lower resource mapping priority of information indicates a longer symbol distance between a target time-domain symbol of the information and a time-domain symbol of a reference signal; or a higher resource mapping priority of information indicates that a target time-domain symbol of the information is located before a time-domain symbol of a reference signal; otherwise, a lower resource mapping priority of information indicates that a target time-domain symbol of the information is located after a time-domain symbol of a reference signal.

Alternatively, the resource mapping manner may include: If a resource mapping priority of information is lower, when the information is transmitted on fewer time-domain symbols or when the information collides with information with a higher priority during mapping, the information with the lower priority is first discarded; otherwise, the information with the lower priority is discarded lastly. Alternatively, it may be predefined that only information with a high priority is mapped onto a resource having fewer uplink time-domain symbols, while information with a high priority and a low priority may be mapped onto a large resource.

Figure 5:
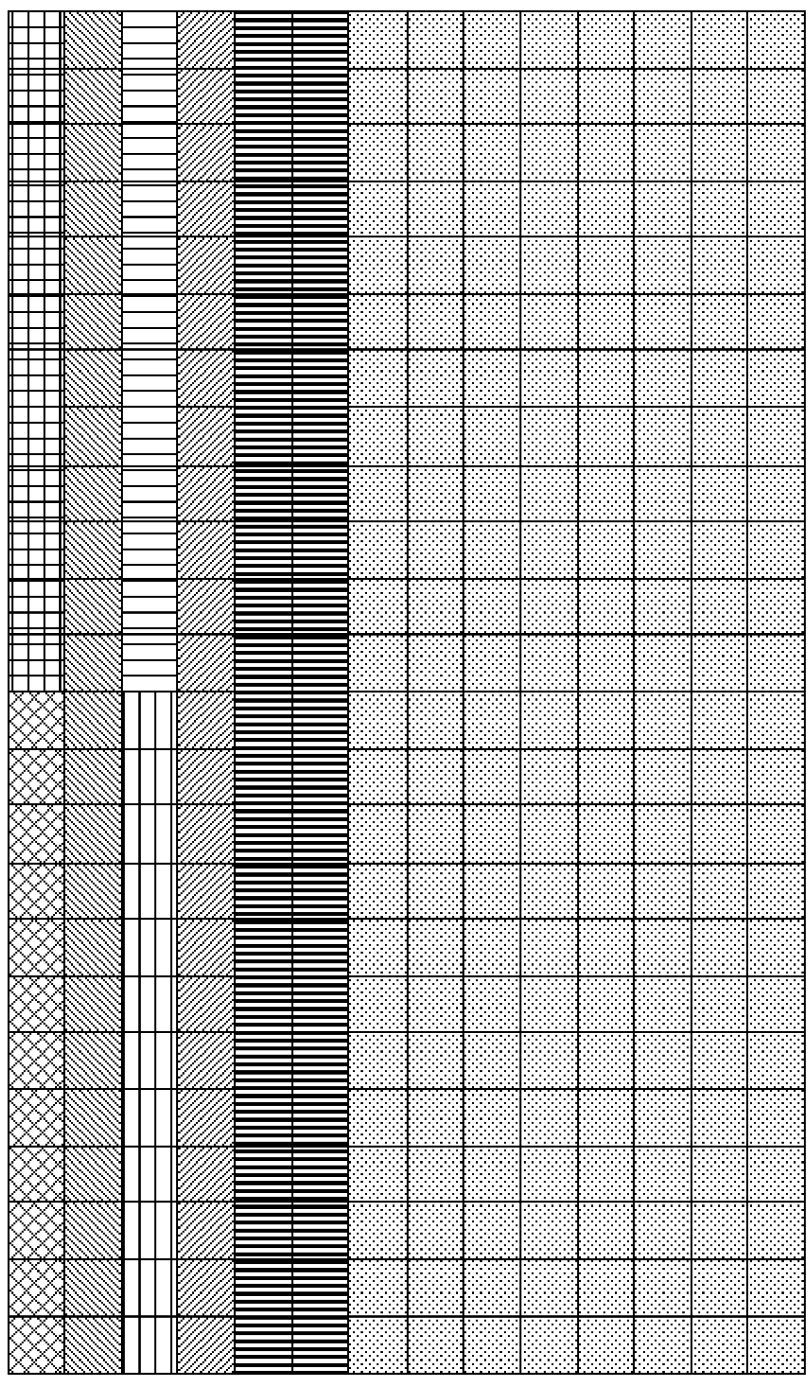
FIG. 5 is a schematic diagram of resource mapping according to an embodiment of this application.

For example, when a reference signal is a demodulation reference signal (DMRS), the DMRS occupies the first time-domain symbol, and a sequence of resource mapping priorities is (the HARQ-ACK and the RR)>(the RI, the BI, and the RSRP)>(the CQI and the PMI)>data (Data), a schematic diagram of resource mapping obtained based on the foregoing resource mapping manner is shown in FIG. 5.

It should be understood that, the sequence of the resource mapping priorities is only an example, and should not constitute any limitation on this embodiment of this application. In this embodiment of this application, another sequence of the resource mapping priorities may be used, for example, (the HARQ-ACK and the RR)>(the RI)>(the BI, the RSRP, the CQI, and the PMI)>data (Data).

As shown in FIG. 5, a target time-domain symbol of the HARQ-ACK and the RR is positioned close to the time-domain symbol of the DMRS, a target time-domain symbol of the RI and the BI is the second time-domain symbol behind the time-domain symbol of the DMRS, a target time-domain symbol of the RSRP is behind the time-domain symbol of the DMRS and is the fourth/fifth symbol, target time-domain symbols of the CQI and the PMI are behind the target time-domain symbol of the RSRP, and time-domain symbols behind the target time-domain symbols of the CQI and the PMI are time-domain symbols that may be occupied by the data. Information on each time-domain symbol is processed in a frequency division manner.

Figure 6:
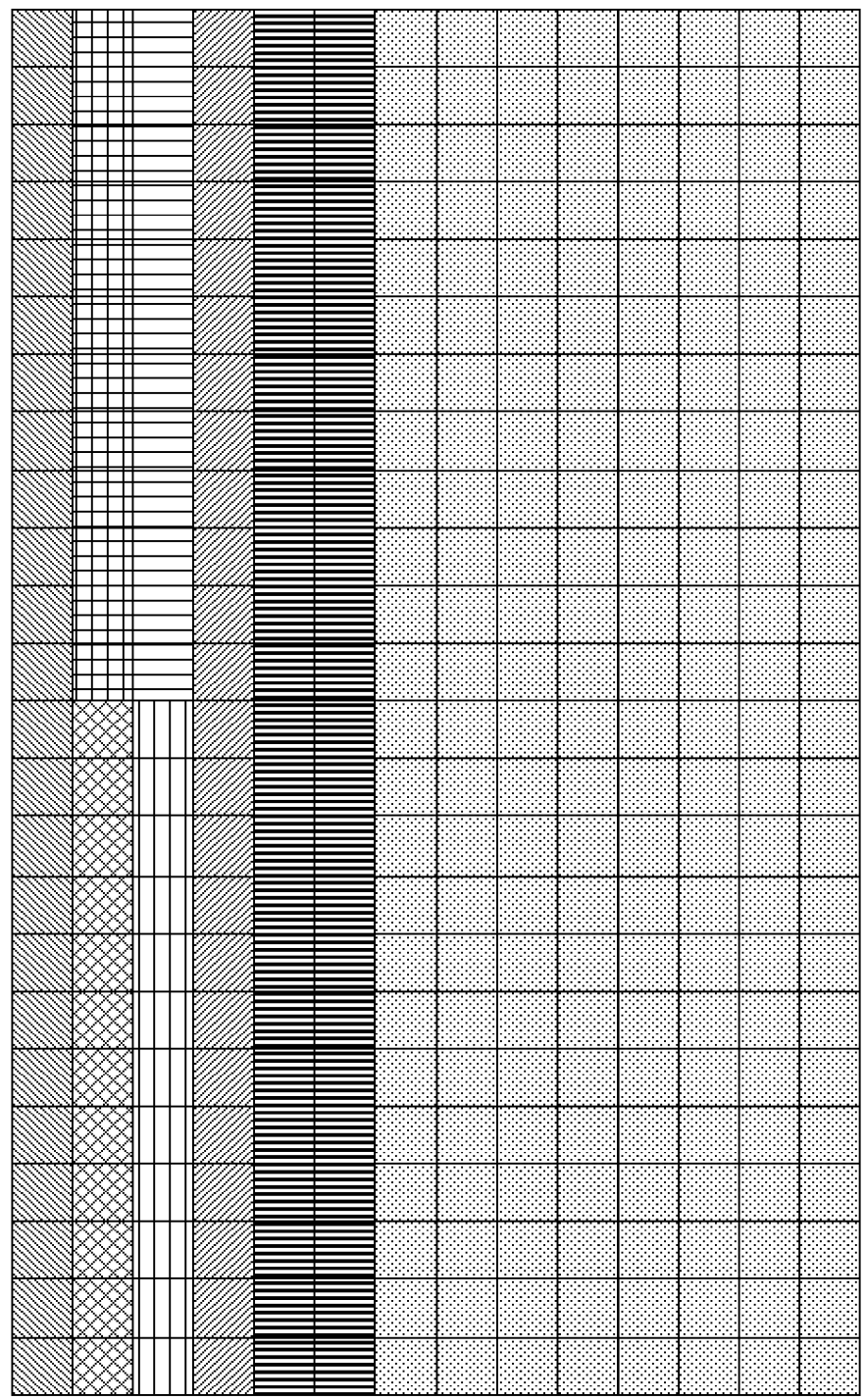
FIG. 6 is a schematic diagram of resource mapping according to another embodiment of this application.

When a reference signal is a DMRS, the DMRS occupies the second symbol in a subframe, and a sequence of the resource mapping priorities is (the HARQ-ACK and the RR)>(the RI, the BI, and the RSRP)>(the CQI and the PMI)>data (Data), a schematic diagram of resource mapping obtained based on the foregoing resource mapping manner is shown in FIG. 6.

As shown in FIG. 6, a target time-domain symbol of (the HARQ-ACK and the RR) is the first time-domain symbol, a target time-domain symbol of the RI and the BI is the third time-domain symbol, a target time-domain symbol of the RSRP is the fourth/fifth symbol, target time-domain symbols of the CQI and the PMI are behind the target time-domain symbol of the RSRP, and time-domain symbols behind the target time-domain symbols of the CQI and the PMI are time-domain symbols that may be occupied by the data.

FIG. 6 describes a case in which one subframe has one DMRS. When slot or mini-slot convergence is supported, each slot or mini-slot may have its own DMRS. In this case, resource mapping may be performed on a plurality of slots or mini-slots uniformly.

Figure 7:
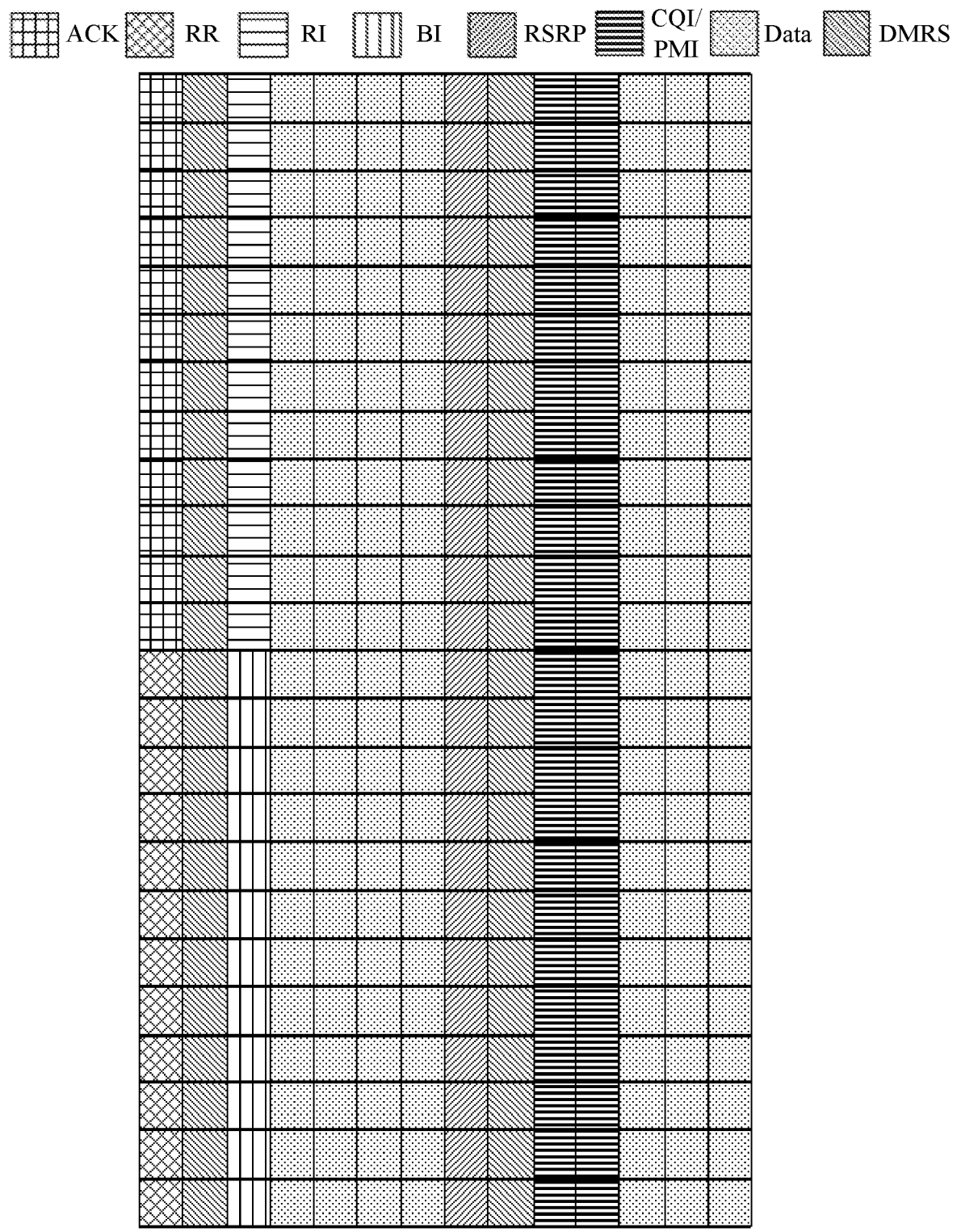
FIG. 7 is a schematic diagram of resource mapping according to another embodiment of this application.

When a reference signal is a DMRS, the DMRS occupies the second symbol in a subframe, and a sequence of the resource mapping priorities is (the HARQ-ACK and the RR)>(the RI, the BI, and the RSRP)>(the CQI and the PMI)>data (Data), a schematic diagram of resource mapping performed on the plurality of slots or mini-slots uniformly based on the foregoing resource mapping manner is shown in FIG. 7.

As shown in FIG. 7, a target time-domain symbol of the ACK and the RR may be near to a time-domain symbol occupied by a DMRS in the first slot or mini-slot, and target time-domain symbols of the RI, the CRI, and the BI may be near to the time-domain symbol occupied by a DMRS in the second slot or mini-slot.

When sending the second uplink control information by using the plurality of beams in the second beam set, the terminal may further map the second uplink control information onto a resource based on a resource mapping priority. For a specific implementation, refer to the implementation of the first uplink control information. For brevity, details are not further described herein.

The following describes several slot sending methods.

A slot sending method may include: When the network device sends data of a transport block (transmission block, TB) to the terminal, after performing code block segmentation, channel coding, rate matching, and code block concentration on the data, the network device may modulate generated bits based on an allocated modulation and coding scheme (MCS) according to the prior art. A difference between the method and the prior art lies in that the generated bits are modulated based on different modulation schemes. A simple manner of modulating the bits by using different modulation schemes is even division, and corresponding modulation symbols are generated based on the different modulation schemes. Interleaving may also be considered to be performed on modulation symbols before resource mapping.

In the interleaving manner, if a mini-slot includes a plurality of time-domain symbols, and transmitted content has no requirement for a delay, the modulation symbols may be interleaved across the time-domain symbols; or if transmitted content has a requirement for a delay, the modulation symbols may be interleaved within each time-domain symbol. Finally, resource mapping is performed.

Correspondingly, when receiving data, the terminal first demodulates received symbols based on a reference MCS in downlink control information (DCI) in scheduling signaling and an offset of an MCS, to obtain corresponding bits. Then, the terminal determines a corresponding TB size (a size of a TB block) based on the reference MCS in the signaling, and determines a quantity and a size of code blocks (CB) in the TB, thereby demodulating the corresponding TB.

An advantage of this manner is that different MCSs are used for different bands, to obtain a frequency selective scheduling gain. A plurality of MCSs are indicated in the DCI in the scheduling signaling. One of the plurality of MCSs is set to the reference MCS, the rest of the plurality of MCSs represent relative values with respect to the reference MCS. This can bring about an advantage of reducing scheduling overheads.

The overhead-reducing differential MCS scheme in this method is applied to same time-domain symbols, and differential MCSs may be used between different subbands, different code blocks, or different code block groups. One subband corresponds to a portion of allocated bandwidths, and the portion corresponds to one CB or a plurality of CBs (CB group, code block group). Similarly, the method may be further applied to different time units. The terminal may obtain a corresponding MCS by receiving one reference MCS and a relative value.

Another slot sending method may include: When the network device sends data of a TB to the terminal, after performing code block segmentation, channel coding, rate matching, and code block concentration on the data, the network device directly modulates the data according to the prior art. A difference between this method and the prior art lies in that code blocks are interleaved, are modulated based on a same MCS after interleaving, and then are mapped onto REs.

In the interleaving manner, if a mini-slot includes a plurality of time-domain symbols, and transmitted content has no requirement for a delay, code blocks may be interleaved across the time-domain symbols; or if transmitted content has a requirement for a delay, code blocks may be interleaved within each symbol. Finally, resource mapping is performed.

Correspondingly, when receiving the data, the terminal demodulates received symbols based on an MCS in DCI in scheduling signaling, and performs a de-interleaving operation in the used interleaving manner after the received signal is demodulated, thereby demodulating the corresponding TB.

An advantage of this manner is that code blocks are interleaved, to eliminate frequency selective fading, and the interleaving manner also considers different delay requirements.

Another slot sending method may include: When the network device sends data of a TB to the terminal, after performing code block segmentation, channel coding, rate matching, and code block concentration on the data, and modulating the data based on a same MCS, the network device performs resource mapping according to the prior art.

A difference between this method and the prior art lies in that modulation symbols are interleaved, and then resource mapping is performed.

In the interleaving manner, if a mini-slot includes a plurality of time-domain symbols, and transmitted content has no requirement for a delay, the modulation symbols may be interleaved across the time-domain symbols; or if transmitted content has a requirement for a delay, the modulation symbols may be interleaved within each time-domain symbol. Resource mapping is performed after interleaving.

An advantage of this manner is that the modulation symbols are interleaved, to eliminate frequency selective fading, and the interleaving manner also considers different delay requirements.

The three schemes may also be applied to a case in which a plurality of TBs are sent. For example, different TBs correspond to different subbands.

Another slot sending method may include: The network device sends configuration information of a subband to the terminal, where one subband corresponds to a portion of allocated bandwidths, and the portion corresponds to one CB or a plurality of CBs (CB group, code block group). The configuration information may include a bandwidth and a subband quantity; or a frequency domain size of a subband and a subband quantity; or a bandwidth and a frequency domain size of a subband; or a bandwidth, a frequency domain size of a subband, and a subband quantity. UE may obtain a corresponding subband division status based on the configuration information, to determine an FFT size corresponding to the UE. By using a UE capability, the UE can report a cell (carrier) quantity, or a subband quantity, or a cell quantity and a subband quantity that the UE is able to support.

If one subband includes one code block group, code blocks may be interleaved within the one code block group. Interleaving may be performed on coded bits or on modulated symbols.

The following describes a terminal and a network device according to the embodiments of this application with reference to FIG. 8 to FIG. 11.

Figure 8:
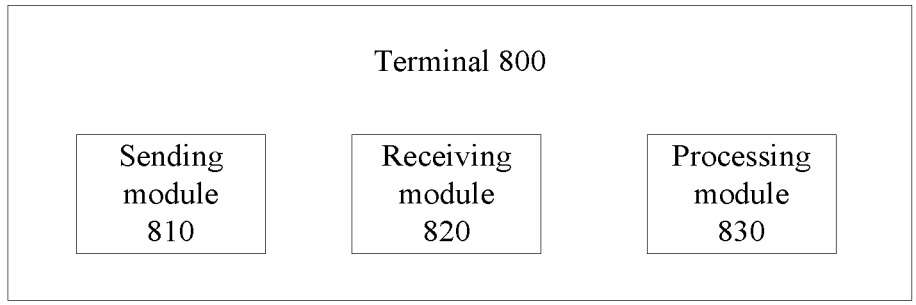
FIG. 8 is an illustrative flowchart of a terminal according to an embodiment of this application.

FIG. 8 is an illustrative structural diagram of a terminal according to an embodiment of this application. It should be understood that the terminal 800 shown in FIG. 8 is only an example. The terminal in this embodiment of this application may further include another module or unit, or include modules with functions similar to those of modules in FIG. 8, or not necessarily include all modules in FIG. 8.

A sending module 810 is configured to send first uplink control information by using a plurality of spatial resources in a first spatial resource set.

The terminal transmits uplink control information by using the plurality of spatial resources. This can improve transmission reliability of the uplink control information, thereby improving communication reliability.

Optionally, the sending module may be specifically configured to send the first uplink control information in a plurality of time-divided time units by using the plurality of spatial resources in the first spatial resource set.

Optionally, the terminal may further include a receiving module 820, and the receiving module is configured to receive first indication information, where the first indication information is used to indicate the plurality of spatial resources in the first spatial resource set.

Optionally, the first uplink control information may include at least one of the following information: a hybrid automatic repeat request message, rank indicator information, channel quality indicator information, a precoding matrix index, recovery request information, resource identifier information, and reference signal received power.

Optionally, the terminal may further include a processing module 830, configured to map the first uplink control information onto a time-domain resource based on a resource mapping priority of the first uplink control information.

Optionally, the terminal further includes a receiving module, configured to receive downlink scheduling information, where the downlink scheduling information includes modulation and coding schemes of a plurality of time units in a first time unit set; and a spatial resource in the first spatial resource set is a spatial resource used to transmit a first transport block, and a modulation and coding scheme of the first transport block is a modulation and coding scheme in the modulation and coding schemes of the plurality of time units that meets a first condition.

Optionally, the first spatial resource set is a subset of a second spatial resource set, the second spatial resource set comprises a plurality of spatial resources used to send second uplink control information by the terminal, and the second uplink control information and the first uplink control information are different types of information.

It should be understood that the foregoing and other operations and/or functions of the units in the terminal according to this embodiment of this application shown in FIG. 8 are intended to implement the corresponding procedure performed by the terminal in the communication method in FIG. 2. For brevity, details are not further described herein.

Figure 9:
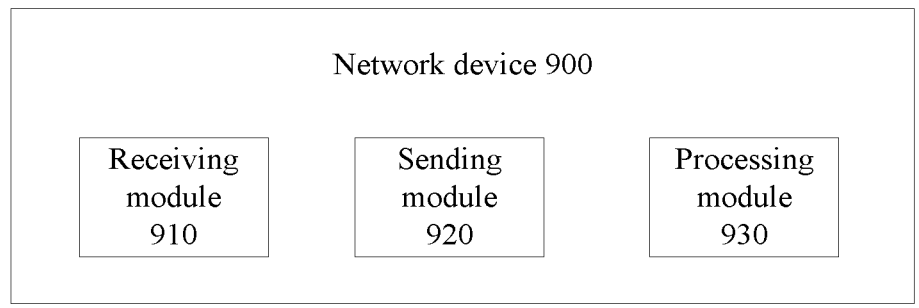
FIG. 9 is an illustrative flowchart of a network device according to an embodiment of this application.

FIG. 9 is an illustrative structural diagram of a network device according to an embodiment of this application. It should be understood that the network device 900 shown in FIG. 9 is only an example. The network device in this embodiment of this application may further include another module or unit, or include modules with functions similar to those of modules in FIG. 9, or not necessarily include all modules in FIG. 9.

A receiving module 910 is configured to receive the first uplink control information sent by a terminal by using a plurality of spatial resources in a first spatial resource set.

The network device receives uplink control information transmitted by the terminal by using the plurality of spatial resources. This can improve transmission reliability of the uplink control information, thereby improving communication reliability.

Optionally, the receiving module may be specifically configured to receive the first uplink control information sent by the terminal in a plurality of time-divided time units by using the plurality of spatial resources in the first spatial resource set.

Optionally, the network device further includes a sending module 920, configured to send first indication information, where the first indication information is used to indicate the plurality of spatial resources in the first spatial resource set.

Optionally, the first uplink control information includes at least one of the following information: a hybrid automatic repeat request message, rank indicator information, channel quality indicator information, a precoding matrix index, recovery request information, resource identifier information, and reference signal received power.

Optionally, the network device further includes a processing module 930, configured to obtain the first uplink control information in a time-domain resource based on a resource mapping priority of the first uplink control information.

Optionally, the network device further includes a sending module, configured to send downlink scheduling information, where the downlink scheduling information includes modulation and coding schemes of a plurality of time units in a first time unit set; and a spatial resource in the first spatial resource set is a spatial resource used to transmit a first transport block, and a modulation and coding scheme of the first transport block is a modulation and coding scheme in the modulation and coding schemes of the plurality of time units that meets a first condition.

Optionally, the first spatial resource set is a subset of a second spatial resource set, the second spatial resource set includes a plurality of spatial resources used to send second uplink control information by the terminal, and the second uplink control information and the first uplink control information are different types of information.

It should be understood that the foregoing and other operations and/or functions of the units in the network device according to this embodiment of this application shown in FIG. 9 are intended to implement the corresponding procedure performed by the network device in the communication method in FIG. 2. For brevity, details are not further described herein.

Figure 10:
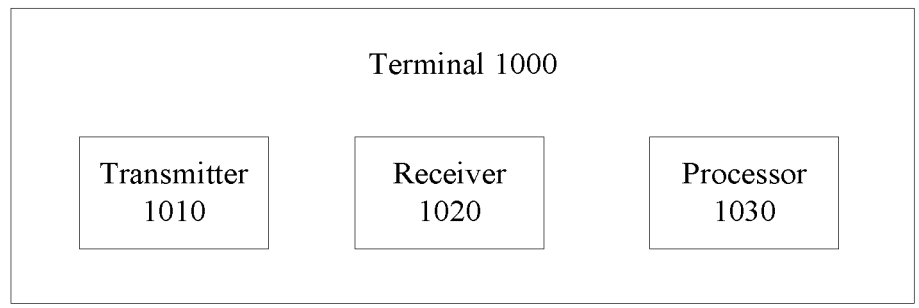
FIG. 10 is an illustrative flowchart of a terminal according to another embodiment of this application.

FIG. 10 is an illustrative structural diagram of a terminal 1000 according to another embodiment of this application. It should be understood that the terminal shown in FIG. 10 is only an example. The terminal in this embodiment of this application may further include another module or unit, or include modules with functions similar to those of modules in FIG. 10, or not necessarily include all modules in FIG. 10.

A processor 1030 may be configured to perform the step or operation that can be performed by the processing module 830 in FIG. 8, a transmitter 1010 may be configured to perform the step or operation that can be performed by the sending module 810 in FIG. 8, and a receiver 1020 may be configured to perform the step or operation that can be performed by the receiving module 820 in FIG. 8. For brevity, details are not further described herein.

It can be understood that the receiver 1020 and the transmitter 1010 may exist independently, or may be integrated together and be referred to as a transceiver.

Figure 11:
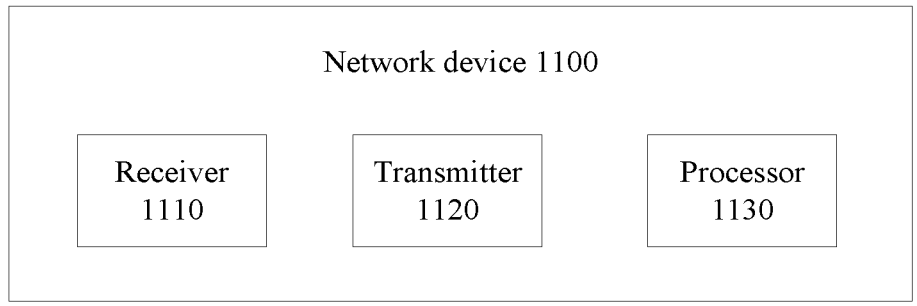
FIG. 11 is an illustrative flowchart of a network device according to another embodiment of this application.

FIG. 11 is an illustrative structural diagram of a network device 1100 according to another embodiment of this application. It should be understood that the network device shown in FIG. 11 is only an example. The network device in this embodiment of this application may further include another module or unit, or include modules with functions similar to those of modules in FIG. 11, or not necessarily include all modules in FIG. 11.

A processor 1130 may be configured to perform the step or operation that can be performed by the processing module 930 in FIG. 9, a transmitter 1120 may be configured to perform the step or operation that can be performed by the sending module 920 in FIG. 9, and a receiver 1110 may be configured to perform the step or operation that can be performed by the receiving module 810 in FIG. 8. For brevity, details are not further described herein.

It can be understood that the receiver 1110 and the transmitter 1120 may exist independently, or may be integrated together and be referred to as a transceiver.

A person of ordinary skill in the art may be aware that, units and algorithm steps in the examples described with reference to the embodiments disclosed in this specification can be implemented by software, hardware, firmware, or a combination thereof. Whether these functions are performed by hardware or software depends on particular applications and design constraint conditions of the technical solutions. A person skilled in the art may use different methods to implement the described functions for each particular application, but it should not be considered that the implementation goes beyond the scope of this application. When software is used to implement the embodiments, the embodiments may be implemented completely or partially in a form of a computer program product. The computer program product includes one or more computer instructions. When the computer program instruction is loaded and executed on a computer, the procedures or functions according to the embodiments of this application are all or partially generated. The computer may be a general-purpose computer, a special-purpose computer, a computer network, or other programmable apparatuses. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, through a coaxial cable, an optical fiber, or a digital subscriber line (DSL)) or wireless (for example, through infrared, radio, or a microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk Solid State Disk (SSD)), or the like.

It may be clearly understood by a person skilled in the art that, for the purpose of convenient and brief description, for a detailed working process of the foregoing system, apparatus, and unit, reference may be made to a corresponding process in the foregoing method embodiments, and details are not further described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method comprising:
   receiving, by a terminal, first indication information, wherein the first indication information is used to indicate a plurality of spatial resources in a first spatial resource set, wherein the first indication information comprises quasi-colocated (QCL) information which indicates that a demodulation reference signal (DMRS) port and a sounding reference signal (SRS) port are quasi-colocated with respect to a specific parameter; and
   sending, by the terminal, first uplink control information by using the plurality of spatial resources in the first spatial resource set.

2. The communication method according to claim 1, wherein the sending the first uplink control information comprises:
   sending, by the terminal, the first uplink control information in a plurality of time-divided time units by using the plurality of spatial resources in the first spatial resource set.

3. The communication method according to claim 1, wherein the first uplink control information comprises at least one of the following information: a hybrid automatic repeat request message, rank indicator information, channel quality indicator information, a precoding matrix index, recovery request information, resource identifier information, and reference signal received power.

4. The communication method according to claim 1, wherein the sending the first uplink control information comprises:
   mapping, by the terminal, the first uplink control information onto a time-domain resource based on a resource mapping priority of the first uplink control information.

5. The communication method according to claim 1, further comprising:
   receiving, by the terminal, downlink scheduling information, wherein the downlink scheduling information comprises modulation and coding schemes of a plurality of time units in a first time unit set; and
   wherein a spatial resource in the first spatial resource set is a spatial resource used to transmit a first transport block, and a modulation and coding scheme of the first transport block is a modulation and coding scheme in the modulation and coding schemes of the plurality of time units that meets a first condition.

6. The communication method according to claim 1, wherein the first spatial resource set is a subset of a second spatial resource set, the second spatial resource set comprises a plurality of spatial resources used to send second uplink control information by the terminal, and the second uplink control information and the first uplink control information are different types of information.

7. A communication method comprising:
   sending, by a network device to a terminal, first indication information, wherein the first indication information is used to indicate a plurality of spatial resources in a first spatial resource set, wherein the first indication information comprises quasi-colocated (QCL) information which indicates that a demodulation reference signal (DMRS) port and a sounding reference signal (SRS) port are quasi-colocated with respect to a specific parameter; and
   receiving, by the network device from the terminal, first uplink control information by using the plurality of spatial resources in the first spatial resource set.

8. The communication method according to claim 7, wherein the receiving the first uplink control information comprises:
   receiving, by the network device, the first uplink control information sent by the terminal in a plurality of time-divided time units by using the plurality of spatial resources in the first spatial resource set.

9. The communication method according to claim 7, wherein the first uplink control information comprises at least one of the following information: a hybrid automatic repeat request message, rank indicator information, channel quality indicator information, a precoding matrix index, recovery request information, resource identifier information, and reference signal received power.

10. The communication method according to claim 7, wherein the receiving the first uplink control information comprises:
    obtaining, by the network device, the first uplink control information in a time-domain resource based on a resource mapping priority of the first uplink control information.

11. The communication method according to claim 7, further comprising:
    sending, by the network device, downlink scheduling information, wherein the downlink scheduling information comprises modulation and coding schemes of a plurality of time units in a first time unit set; and
    wherein a spatial resource in the first spatial resource set is a spatial resource used to transmit a first transport block, and a modulation and coding scheme of the first transport block is a modulation and coding scheme in the modulation and coding schemes of the plurality of time units that meets a first condition.

12. The communication method according to claim 7, wherein the first spatial resource set is a subset of a second spatial resource set, the second spatial resource set comprises a plurality of spatial resources used to send second uplink control information by the terminal, and the second uplink control information and the first uplink control information are different types of information.

13. A terminal comprising:
    a receiver, configured to cooperate with a processor to receive first indication information, wherein the first indication information is used to indicate a plurality of spatial resources in a first spatial resource set, wherein the first indication information comprises quasi-colocated (QCL) information which indicates that a demodulation reference signal (DMRS) port and a sounding reference signal (SRS) port are quasi-colocated with respect to a specific parameter; and a transmitter, configured to cooperate with the processor to send first uplink control information by using the plurality of spatial resources in the first spatial resource set.

14. The terminal according to claim 13, wherein the transmitter is further configured to:
send the first uplink control information in a plurality of time-divided time units by using the plurality of spatial resources in the first spatial resource set.

15. The terminal according to claim 13, wherein the first uplink control information comprises at least one of the following information: a hybrid automatic repeat request message, rank indicator information, channel quality indicator information, a precoding matrix index, recovery request information, resource identifier information, and reference signal received power.

16. The terminal according to claim 13, further comprising: the processor, configured to map the first uplink control information onto a time-domain resource based on a resource mapping priority of the first uplink control information.

17. The terminal according to claim 13, further comprising: the receiver, configured to cooperate with a processor to receive downlink scheduling information, wherein the downlink scheduling information comprises modulation and coding schemes of a plurality of time units in a first time unit set; and wherein a spatial resource in the first spatial resource set is a spatial resource used to transmit a first transport block, and a modulation and coding scheme of the first transport block is a modulation and coding scheme in the modulation and coding schemes of the plurality of time units that meets a first condition.

* * * * *